Nov. 21, 1950     H. S. SHANNON     2,530,485
ANIMAL HOUSE
Filed May 1, 1946
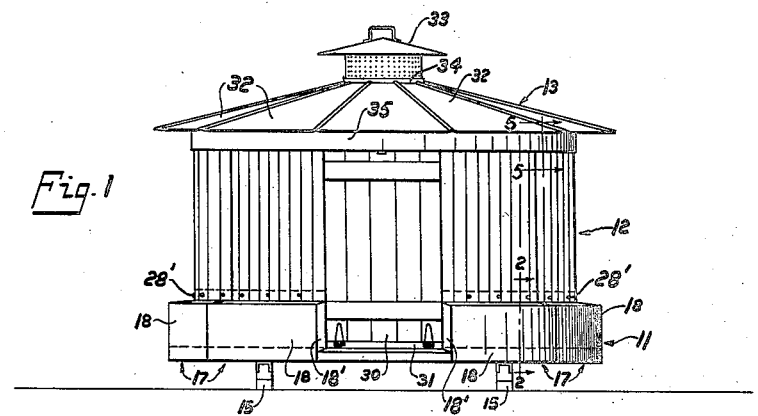
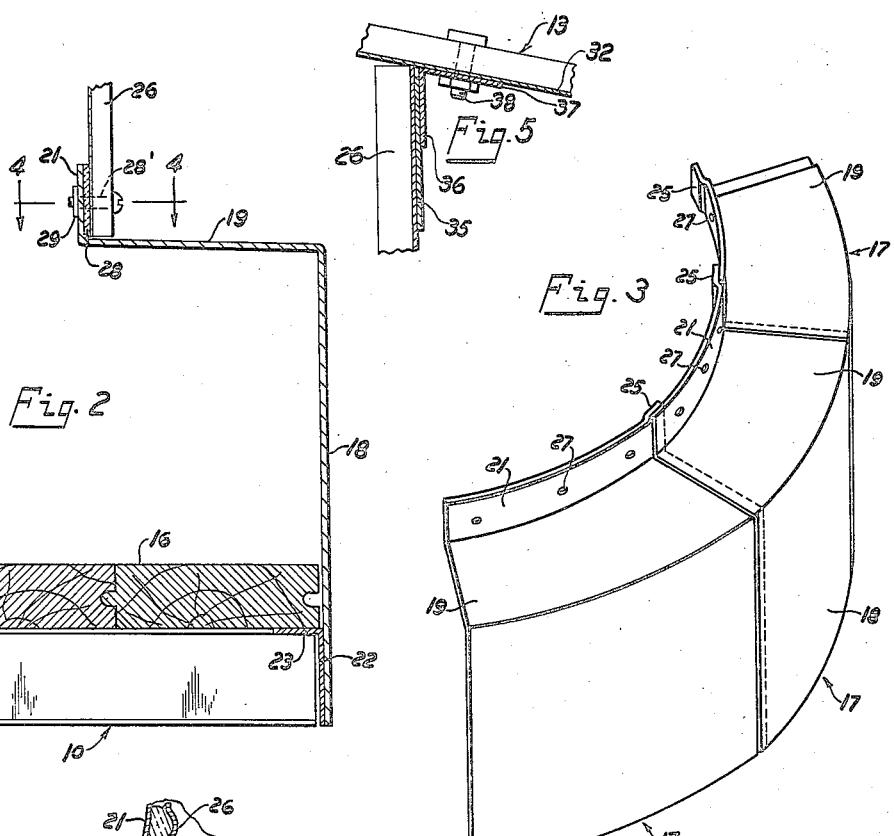
INVENTOR.
H. S. SHANNON.
BY
ATTORNEY.

Patented Nov. 21, 1950

2,530,485

UNITED STATES PATENT OFFICE 2,530,485

ANIMAL HOUSE

Harold S. Shannon, Detroit, Mich., assignor to National Steel Corporation, a corporation of Delaware Application May 1, 1946, Serial No. 666,411

7 Claims. (Cl. 119—16)

This invention relates generally to animal shelters and more particularly to hog houses.

In the past, the farmer has sustained great losses of young pigs fatally injured by being lain upon by the sow in hog or farrowing houses. In an effort to eliminate or lessen the loss of young pigs in this manner, hog houses of various constructions have been proposed in some of which guard rails are provided under which young pigs are protected against being lain upon by the sow. The objection to most of these guard rails is that, due to their position inwardly of the side wall of the house, they necessitate the construction of a larger house, than would otherwise be necessary, in order to provide the same amount of room for the sow. This objection has been somewhat overcome in other known types of hog houses by the provision for young pigs of an opening in the house side wall near the ground leading into a box-like structure outside of the house proper. However, this box-like structure is not a structural part of the house, but instead is an additional young pig house communicating with the larger hog house, thus entailing added costs of material and construction. Furthermore, in none of the past hog houses embodying means for protecting the young pigs have the constructions been such as to lend themselves to mass production and resultant low cost of construction.

Accordingly, one of the objects of the present invention is to provide a new and improved animal shelter in which the above mentioned objections are obviated.

Another object of the invention is to provide a new and improved hog house including a young pig guard of a character which may be mass produced with resultant savings in cost of manufacture of such buildings.

Another object of the invention is to provide for a hog house a lower side wall-pig guard structure of a character to effect a savings in material and consequently in cost of construction.

Other objects of the invention will become apparent from the following detailed description taken in connection with accompanying drawings in which:

Fig. 1 is a side elevational view of a hog house embodying features of the present invention;

Figure 2 is a vertical, sectional view of the hog house taken along the line 2—2 of Figure 1;

Figure 3 is a fragmentary isometric view of a lower side wall structure of the hog house;

Figure 4 is a view in cross-section of a detail of the hog house taken along the line 4—4 of Figure 2; and Figure 5 is a view in cross-section of a portion of the hog-house taken along line 5—5 of Figure 1.

In the drawing which illustrate a preferred embodiment of the invention, the hog house shown comprises in general, a supporting structure 10, a lower side wall structure 11, an upper side wall structure 12, and a roof 13. The lower side wall structure 11 is supported by and on the supporting structure 10 and in turn supports the entire upper structure of the building. The supporting structure 10 may comprise a plurality of laterally spaced steel floor joists 14 connected together, as by welding, to a pair of skid supports 15. Suitable flooring 16 is provided, supported on and secured to the floor joist 14.

In order to provide a strong, rigid house without need of framing structure, the lower side wall structure 11 and the upper side wall structure 12 are made generally cylindrical in shape, the lower wall structure 11 being annular or ring-like as viewed from above. To facilitate production and construction of the lower wall structure 11, it is made in cylindrical sections or segments 17 preferably of sheet steel. Each of the cylindrical wall segments 17 comprises an upright, exterior wall portion 18 and an upper, inwardly extending annular wall portion 19. The upper annular wall portion 19 extends over an outer portion of the flooring 16 in spaced relation thereabove, beneath the lower edge of the upper side wall structure 12. Along its inner edge, the wall portion 19 is provided with an upturned flange 21 which positions inwardly of the side wall 12 for connection therewith. In addition to being the lower side wall structure of the house, the segmental structure 11 also provides a guard and shelter under which young pigs may go to avoid being lain upon by the sow. the imperforate guard wall 19 being made sufficiently low, of course, to restrict the sow to the central area within the upper side wall 12. Adjacent their lower edges, each of the wall segments 17 of the lower wall-pig guard structure is provided with and carries a seating or sill member 22 which supports the segments on the joists 14 of the supporting structure 10. The sill members 22 are of arcuate shape to conform to the curvature of the wall 18. In the present construction, these sill members 22 are of angle cross-section each having a vertical leg secured preferably by welding to the inner side of the upright wall 18 and having a horizontal leg 23 for seating on the joist 14 of the supporting structure 10 between the joist and flooring 16. As shown in Figure 3, adjacent end portions of the segments 17 of the lower wall pigguard structure are overlapped for connection together, the segments 17 preferably being welded together along these overlapped portions. Also, the corresponding ends of the segments 17 at the overlapping portions, including the upright wall 18, inwardly extending wall 19, and the upturned flange 21 are preferably offset inwardly, as at 25, substantially the thickness of the sheet metal. These offset overlapping portions 25 act to locate the segments of the lower side wall structure relative to each other as they are being assembled and they also provide for flush outer joints between the segments.

Preferably the upper side wall structure 12 comprises a plurality of overlapped corrugated metallic sheets 26 arranged preferably so that the corrugations extend vertically. These corrugated sheets 26 seat at their lower ends on the inwardly extending, annular wall 19 of the lower wall structure 11, outwardly of the upturned flanges 21. A sealing strip 28 of any suitable material is preferably interposed between the inner sides of the corrugated sheets 26 and the flanges 21 to insure joints of weathertight construction. Preferably, this sealing strip is preformed on one side of the corrugated contour to fit complementary with the corrugation of the side wall sheets 26. A plurality of holes in and spaced along the flange 21 of each of the guard segments 17 are provided to match with similar holes in the corrugated sheets 26 to receive bolts 28' on which nuts 29 may be tightened to secure the upper and lower side wall structures together. The continuity of the lower side wall structure 11 and of the upper side wall structure 12 is interrupted by a doorway closable by a door 30. The door 30 is preferably hinged adjacent its bottom edge to a door sill 31, the door when opened being swung down to serve as a ramp for the animals. At the door opening, the ends of the guard segments 17 are closed, as at 18' by extended portions of walls 18 which may be bent inwardly and be welded along the seams at the sill and at the wall 19.

The roof 13 may be of any suitable construction such as the frusto-conical roof shown in Figure 1. This roof comprises a plurality of exterior cover panels 32 preferably metallic sheets having adjacent edges suitably joined to provide a weathertight construction. At the top of the roof 13 the roof panels have their inner ends secured to and support a collar 34 in which a ventilator 33 may be mounted.

Extending around the side wall 12 just beneath the roof 13 there is a cornice panel 35 which may be welded or be otherwise secured to the corrugated wall sheathing 26.

Secured to the outer side of the cornice panel 35 as by welding, a plurality of spaced angle brackets 36 are provided, each having an outwardly extending leg 37 at the top of the side wall to which to secure the roof panels 32, preferably by nuts and bolts 38.

I claim:

1. An animal house comprising a floor, an upper side wall having a lower edge terminating in spaced relation to and above the floor, a lower exterior side wall extending upwardly above the floor offset outwardly from the upper side wall, a laterally extending, imperforate wall joined to the lower side wall, the laterally extending wall extending inwardly beneath the lower edge of the upper side wall at a height above the floor providing a refuge for young animals at a height restricting large animals to the area inwardly of the upper side wall, and an upwardly directed flange on the laterally extending wall positioned inwardly of the upper side wall for connection therewith.

2. An animal house comprising, a supporting structure, a floor on the supporting structure, an upper side wall having a lower edge terminating in spaced relation to and above the floor at a height to restrict a large animal to the area inwardly of the upper side wall, a lower side wall offset outwardly from the upper side wall and being joined thereto by a laterally extending wall, the lower side wall and the laterally extending wall defining an enclosed refuge for young animals outwardly of the upper side wall, and a seating member including a laterally extending leg seated on the supporting structure, said seating member being carried by and supporting the lower side wall.

3. An annular lower side wall animal guard structure for an animal house comprising, a plurality of overlapping connected together sections each comprising an upright cylindrical wall segment and an upper inwardly extending annular wall segment integral with said upright wall segment and an upturned flange extending along the inner edge of said annular wall segment.

4. An animal house comprising a floor, an upper cylindrical side wall having vertical corrugations, a roof carried by said upper cylindrical side wall, an annular lower side wall animal guard structure including a lower cylindrical side wall extending upwardly from the floor and an inwardly extending exterior wall joined to the lower cylindrical side wall, the inwardly extending wall overlying an outer portion of the floor in spaced relation thereabove, and a flange extending upwardly along the inner edge of the inwardly extending exterior wall positioned inwardly of the upper side wall, and sealing means between said flange and the corrugated upper side wall for providing a weather-tight seal therebetween, said lower side wall-animal guard structure supporting the upper cylindrical side wall.

5. An animal house comprising a floor, a roof, an upper cylindrical side wall carrying the roof, an annular lower side wall animal guard structure supporting said upper cylindrical side wall, said guard structure including a plurality of overlapping connected together sections each comprising an upright cylindrical wall segment extending upwardly from the floor and an upper inwardly extending annular wall segment integrally joined to the upper edge of said upright cylindrical wall segment, and means securing the annular wall segments to the upper cylindrical side wall, said annular wall segments together forming an annular wall overlying a peripheral portion of the floor in spaced relation thereabove and providing a shelter guard under which young animals can avoid larger animals.

6. An animal house comprising a circular floor, an upper exterior side wall terminating in spaced relation to and above the floor, a lower exterior side wall extending upwardly above the floor, an imperforate exterior side wall joined to the lower exterior side wall and extending laterally inwardly from the lower exterior side wall and overlying an outer portion of the floor in spaced relation thereabove to shield small animals from larger animals in the house, the inwardly extending imperforate exterior wall also presenting a supporting surface for the upper exterior side wall, and a flange along the inner edge of the inwardly extending imperforate exterior wall, connected to the lower edge portion of the upper exterior side wall.

7. An animal house comprising a circular floor, an exterior cylindrical upper side wall, a roof carried by said upper side wall, an exterior, lower annular side wall structure supporting the upper side wall, said annular side wall structure including an exterior cylindrical lower side wall extending upwardly from the floor and a laterally inwardly extending annular wall joined to said lower side wall and connected to said upper side wall, said inwardly extending annular wall extending inwardly from the lower side wall to the upper side wall and overlying an outer portion of the floor in spaced relation thereabove and providing a shelter guard under which young animals can avoid larger animals, a hinged door in said upper cylindrical upper side wall and said annular lower side structure, said door extending upwardly from the floor and being offset inwardly from said lower side wall, and a wall extending inwardly from the lower side wall and from the inwardly extending annular wall to each lateral side of the door.

HAROLD S. SHANNON.

REFERENCES CITED

The following references are of record in the file of this patent:

UNITED STATES PATENTS

| Number | Name | Date |
|---|---|---|
| 122,472 | Lindemann | Jan. 2, 1872 |
| 166,596 | Edwards | Aug. 10, 1875 |
| 700,949 | Kluidworth | May 27, 1902 |
| 728,037 | Stone | May 12, 1903 |
| 986,703 | Fulton | Mar. 14, 1911 |
| 1,361,660 | Adix et al. | Dec. 7, 1920 |
| 1,590,982 | Morris | June 29, 1926 |
| 1,605,248 | Leon | Nov. 2, 1926 |
| 1,708,098 | Karley | Apr. 9, 1929 |
| 1,848,690 | Bayley et al. | Mar. 8, 1932 |

FOREIGN PATENTS

| Number | Country | Date |
|---|---|---|
| 367,590 | Great Britain | Feb. 25, 1932 |